Figure 1:
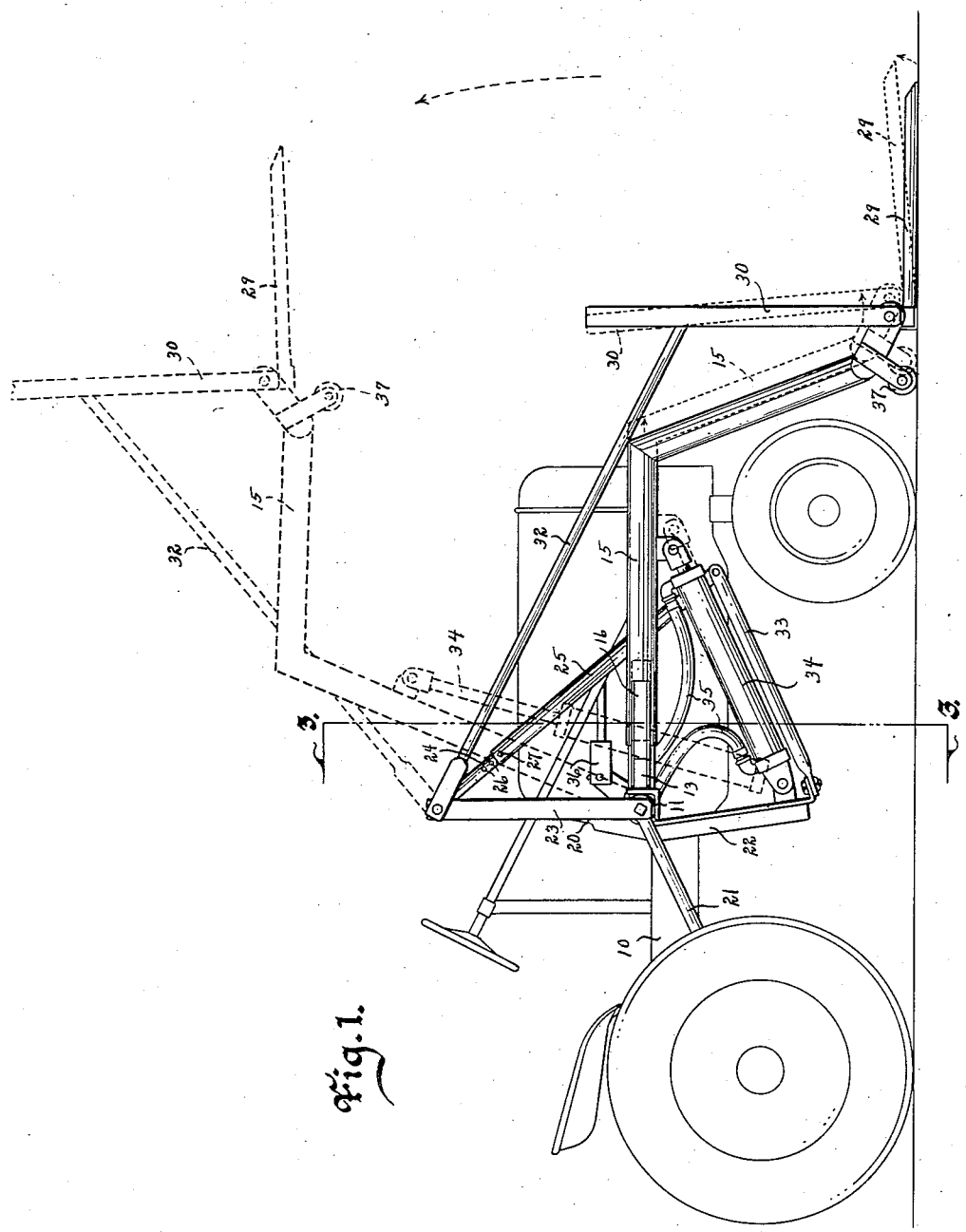

Aug. 20, 1957

S. S. POKORNY 2,803,359

TRACTOR LOADER

Filed April 28, 1955

2 Sheets-Sheet 1

Witness
Edward P. Seeley

Inventor
Stephen S. Pokorny
by Talbert Dick & Adler
Attorneys

Aug. 20, 1957　　　S. S. POKORNY　　　2,803,359
TRACTOR LOADER
Filed April 28, 1955　　　　　　　　　　2 Sheets-Sheet 2
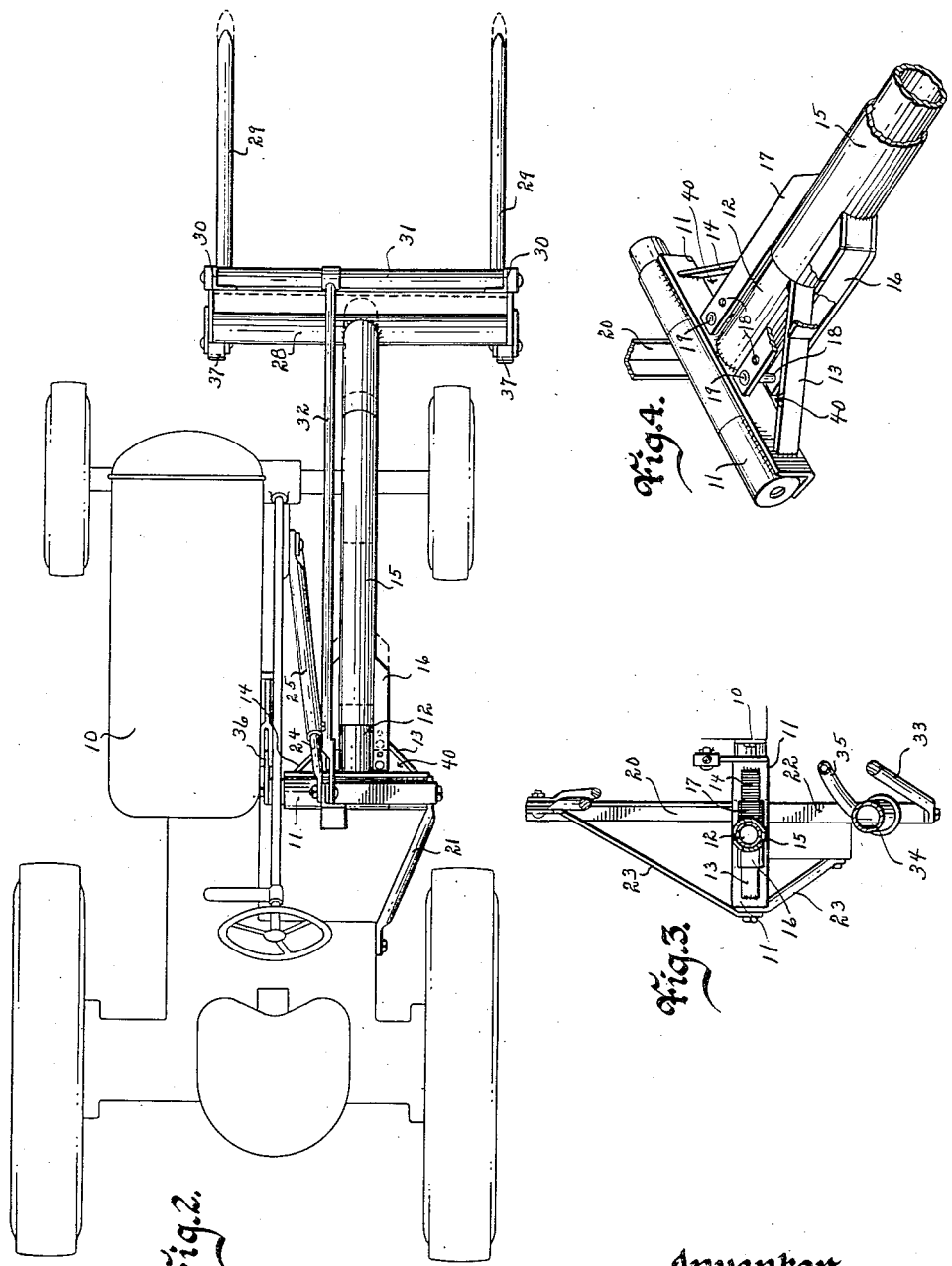
Inventor
Stephen S. Pokorny
by Talbert Dick & Adler
Attorneys
Witness
Edward P. Seeley

United States Patent Office 2,803,359
Patented Aug. 20, 1957

2,803,359

TRACTOR LOADER

Stephen S. Pokorny, Maquoketa, Iowa

Application April 28, 1955, Serial No. 504,423

4 Claims. (Cl. 214—140)

This invention relates to loaders for tractors and more particularly to loaders of the shovel type that are at least raised by hydraulic power means.

Tractors with loaders attached thereon are universally used and this is especially true of substantially all farms. Such loaders have raisable beams carrying a scoop shovel. Due to the fact that the beams are hinged at their rear ends, the shovel will move with the outer ends of the beams in an arc thus resulting in the shovel having its rear end moving downwardly from the horizontal as the shovel moves upwardly. Furthermore, when the shovel is in lowered filled condition, there is no method of first raising its forward end to prevent forward spilling.

Therefore, one of the objects of my invention is to provide a loader that will first tilt its forward end upwardly just prior to the actual lifting and raising of the shovel to an elevated position.

A further object of this invention is to provide a loader that substantially maintains its shovel in a horizontal attitude throughout its lifting movement.

A still further object of this invention is to provide a loader for tractors that may be easily and quickly attached to or detached from a tractor.

A still further object of my invention is to provide a loader that due to its automatic function is capable of being successfully operated by anyone.

Still further objects of my invention are to provide a loader that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my loader mounted on a tractor, with broken lines showing the position of its various elements during operation, Fig. 2 is a top view of my loader installed on a tractor, and more fully illustrates its construction, Fig. 3 is a reduced showing of a vertical sectional view of the device taken on the line 3—3 of Fig. 1, and Fig. 4 is an enlarged perspective view of a shovel beam attaching means with sections broken away to clarify its construction.

Loaders may have one or two shovel lifting beams. My invention is applicable to either type but in the drawings I show a single shovel lifting beam. Also the shovels of such loaders may be in the form of a scoop having a bottom, side walls, and a back, with the top and front open, or the shovel may be in the form of forwardly extending teeth. This lifting device may be closely spaced or only total no more than two, as shown in the drawings. However, it is understood that my invention may be associated with any type of shovel.

In the drawings I have used the numeral 10 to designate an ordinary tractor and to which I install my loader. The numeral 11 designates a base unit which is horizontally hingedly detachably connected by any suitable means such as a bolt shaft or like to the side of the tractor 10, as shown in Fig. 3. This base 11 has a stub cylinder or pipe 12 secured to its forward side and extending parallel with the longitudinal axis of the tractor. The numerals 13 and 14 designate two bar braces secured to the two sides of the stub element 12 and which extend rearwardly and outwardly from each other until they engage the unit 11 to which they are secured and which is illustrated in Fig. 4. By this arrangement of parts there will be a horizontally confined area 40 at each side of the rear portion of the member 12. The numeral 15 designates the shovel lifting beam which has its rear end portion slidably embracing the stub 12. This beam 15, when the loader is in lowered position, extends horizontally forwardly and then extends downwardly and forwardly, as shown in Fig. 1. On each side of the rear end portion of the member 15 I secure a forked element, 16 and 17 respectively. The member 16 extends below and above the brace 13, and the member 17 extends below and above the brace 14. Both the member 16 and the member 17 have a plurality of bolt holes 18 longitudinally arranged through their forked portions for selectively receiving bolts, pins or like, 19. Obviously, these bolts 19 define the movement of the members 16 and 17 within the areas I have designated by the numeral 40. Therefore, the forward sliding movement of the beam 15 on the stub 12 will be limited in its forward movement by the bolts 19 engaging the braces 13 and 14. Furthermore, the holes 18 that are selected for the bolts 19 will determine the permitted sliding movement of the beam 15 on the stub 12. The numeral 20 designates a vertical arm operatively hingedly secured to the member 11. The numeral 21 designates a brace for aiding in the support of the unit 11. The arm 20 may extend downwardly below the unit 11 to form a depending member 22, as shown in Fig. 3, or if desired this part 22 may be a separate one from the member 20 provided it also is operatively hingedly secured to the unit 11. Braces 23 are used to laterally support members 20 and 22, as shown in Fig. 3. The numeral 24 designates a stub shaft hingedly secured to the upper end of the arm 20. The numeral 25 designates a tube having its lower end pivotally secured to the tractor frame and its upper portion slidably embracing the shaft 24. The numeral 26 designates a plurality of holes extending through the shaft 24. The numeral 27 designates a bolt extending through the upper portion of the tube 25 and selectively passing through one of the holes 26 on the shaft 24. By this arrangement the vertical positioning of the arms 20 and 22 may be adjustably obtained. The numeral 28 designates a horizontal cross beam on the forward end of the beam 15. The numeral 29 designates a scoop, shovel, fork, or like, having its rear bottom operatively hingedly secured to the cross beam 28 as shown in Fig. 2. This shovel, fork or like, has two vertical upright posts 30. The numeral 31 designates a brace extending between the uprights 30 near their upper ends. The numeral 32 designates a control shaft having one end operatively pivoted to the cross brace 31 and its other end operatively hingedly secured to the upper end of the arm 20. The numeral 33 designates a brace extending from the lower end of the arm 22 to the tractor frame. The numeral 34 designates an ordinary two-way hydraulic jack having one end horizontally secured to the lower end portion of the arm 22 and its other end hingedly secured to the under side of the beam 15, as shown in Fig. 1. This hydraulic jack 34 has the usual fluid supply conduits adapted to be in selective communication with a source of fluid under pressure. This hydraulic jack installation is standard and is connected in the usual way to the fluid pump (not shown) that is actuated by the prime mover of the tractor. Any suitable type of control may be used for adjustably passing or exiting fluid through the conduits 35. However, for best results I recommend a "touch" control 36. The numeral 37 designates a wheel roller rotatably mounted on each end of the cross beam 28.

The practical operation of the device is as follows: After my loader has been installed, it is placed in lowered position and the telescoping members 24 and 25 adjusted so that the fork or shovel will be positioned to extend horizontally, as shown in Fig. 1. This is done by further contracting the hydraulic jack after the shovel or like has engaged the ground. With the wheels 37 engaging the ground, such further contracting of the hydraulic jack cannot further lower the shovel or like and thus the beam 15 will be pulled rearwardly thereby lowering the forward end of the shovel, fork or like. By the biforked bracket bars 16 and 17 extending above and below the bars 13 and 14, the beam 15 will be held against lateral rotation or twisting. However, when the hydraulic jack is energized for lifting the load, the initial movement of the lifting beam 15 will be forwardly. This forward movement of the beam 15 relative to the stub 12 will be limited, however, by the eventual engagement of the bolts 19 with the bars 13 and 14 and the amount of this forward movement of the beam 15 will therefore depend upon the selected holes 18 through which the bolts 19 are passed. To accomplish this expansion of the telescoped members 12 and 15, either the material lifting unit 29 must move slightly relatively forward or else the tractor must slightly move rearwardly, whichever is of less resistance. However, while the lower portion of the shovel or fork will move relatively forwardly, the upper end of the shovel cannot do so because of the existence of the brace shaft 32. Thus, the upper back end of the shovel or fork will tilt backwardly, and the forward end of the shovel or fork will tilt upwardly, as shown by broken lines in Fig. 1. This will result in the shifting of the weight of the material on the shovel or fork rearwardly and prevent its spilling forwardly from the same when the shovel or fork is elevated. As before discussed, the amount of tilt of the shovel or fork will be regulated by the placement of the bolts 19 in the holes 18. With the further expansion of the hydraulic jack, the shovel or fork lifting beam 15 will move upwardly inasmuch as it cannot further slide outwardly on the stud 12 due to the bolts or pins 19 contacting the brace rods 13 and 14. The brace shaft 32, which was extending downwardly and forwardly when the shovel or fork was in lowered condition, produces still another result, i. e., it holds the shovel or fork substantially parallel with the ground surface throughout the upward swinging movement of the beam 15, as shown in Fig. 1. Heretofore, shovels and forks, which were originally secured to the forward end of the lifting beam, moved in an arc with the lifting beam and therefore its rear end dropped and its forward end raised, thereby often spilling the material over the back of the shovel or fork. However, with my assembly the brace rod 32 will prevent undue tipping of the back of the shovel or fork as it moves upwardly and will hold the shovel or fork in a parallel position to the ground even when the shovel or fork is in the extreme elevated position, as shown by broken lines in Fig. 1. The reason for this is that the pivot point of the rear end of the shaft 32 is substantially above the rear pivot point of the beam 15. Likewise, when the shovel is moved from an elevated position to a lowered position, this brace shaft 32 will maintain the shovel or fork in substantially a level condition. The wheel rollers 37 will engage the ground surface and properly support the fork or shovel when it is in a lowered position.

Some changes may be made in the construction and arrangement of my tractor loader without departing from the real spirit and purpose of my invention, and it is my intention to cover by my claims, any modified forms of structure or use of mechanical equivalents which may be reasonably included within their scope.

I claim:

1. In combination, a tractor, a stub beam hinged to said tractor, a second beam slidably telescoping on said first beam, a material holding unit hinged on the forward end of said second beam, a hydraulic jack means having one end operatively hinged to said tractor and its other end hinged to the said second beam, a control shaft having one end operatively hinged to said tractor at a point above the hinged area of said first beam, and its other end hinged to said material holding unit at a point above the area where it is hinged to said second beam, a stop bar on said first beam, a bracket secured to said second beam, and a stop means on said bracket capable of engaging said stop bar for selectively limiting the forward sliding movement of said second beam.

2. In combination, a tractor, a stub beam hinged to said tractor, a second beam slidably telescoping on said first beam, a material holding unit hinged on the forward end of said second beam, a hydraulic jack means having one end operatively hinged to said tractor and its other end hinged to the said second beam, a control shaft having one end operatively hinged to said tractor at a point above the hinged area of said first beam, and its other end hinged to said material holding unit at a point above the area where it is hinged to said second beam, a stop bar on said first beam, a bracket secured to said second beam, and a stop means adjustably secured on said bracket capable of engaging said stop bar for selectively limiting the forward sliding movement of said second beam.

3. In combination, a tractor, a stub beam hinged to said tractor, a second beam slidably telescoping on said first beam, a material holding unit hinged on the forward end of said second beam, a hydraulic jack means having one end operatively hinged to said tractor and its other end hinged to the said second beam, a control shaft having one end operatively hinged to said tractor at a point above the hinged area of said first beam, and its other end hinged to said material holding unit at a point above the area where it is hinged to said second beam, two rearwardly and outwardly extending stop bars on the two sides respectively of said first beam, two biforked members on the two sides respectively of said second beam, with each biforked member extending below and above one of said stop bars, and a bolt selectively extending through each of the biforked end portions of each of said biforked members and back of the stop bar adjacent to it.

4. In combination, a tractor, a stub beam hinged to said tractor, a second beam slidably telescoping on said first beam, a material holding unit hinged on the forward end of said second beam, a hydraulic jack means having one end operatively hinged to said tractor and its other end hinged to the said second beam, a control shaft having one end operatively hinged to said tractor at a point above the hinged area of said first beam, and its other end hinged to said material holding unit at a point above the area where it is hinged to said second beam, two rearwardly and outwardly extending stop bars on the two sides respectively of said first beam, two biforked members on the two sides respectively of said second beam, with each biforked member extending below and above one of said stop bars; the biforked end portions of each of said biforked members having a plurality of holes, and a pin member selectively detachably extending through the holes of each of said biforked member and to the rear of the stop bar adjacent to it.

References Cited in the file of this patent

UNITED STATES PATENTS

| | | |
|---|---|---|
| 2,287,375 | Ford | June 23, 1942 |
| 2,348,899 | Guignard et al. | May 16, 1944 |
| 2,456,491 | Collins | Dec. 14, 1948 |
| 2,598,944 | Stueland | June 3, 1952 |
| 2,603,374 | McNamara | July 15, 1952 |
| 2,714,460 | Cook | Aug. 2, 1955 |

FOREIGN PATENTS

| | | |
|---|---|---|
| 1,058,523 | France | Mar. 17, 1954 |